United States Patent [19]
Weder

[11] Patent Number: 5,867,968
[45] Date of Patent: *Feb. 9, 1999

[54] MOUNTABLE AND DEMOUNTABLE WRAPPING MATERIAL AND METHOD FOR USE

[75] Inventor: Donald E. Weder, Highland, Ill.

[73] Assignee: Southpac Trust International, Inc.

[*] Notice: The term of this patent shall not extend beyond the expiration date of Pat. No. 5,697,195.

[21] Appl. No.: 965,650

[22] Filed: Nov. 7, 1997

Related U.S. Application Data

[63] Continuation of Ser. No. 474,059, Jun. 7, 1995, Pat. No. 5,697,199, which is a continuation-in-part of Ser. No. 385,604, Feb. 9, 1995, Pat. No. 5,560,181, which is a continuation of Ser. No. 313,675, Sep. 27, 1994, abandoned, which is a continuation of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 474,059, is a continuation-in-part of Ser. No. 370,334, Jan. 9, 1995, Pat. No. 5,537,800, which is a continuation of Ser. No. 253,648, Jun. 3, 1994, abandoned, which is a continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, said Ser. No. 474,059, is a continuation-in-part of Ser. No. 382,096, Jan. 24, 1995, which is a continuation of Ser. No. 202,058, Feb. 25, 1994, Pat. No. 5,411,137, which is a continuation of Ser. No. 93,109, Jul. 16, 1993, Pat. No. 5,311,992, which is a continuation-in-part of Ser. No. 892,441, Jun. 2, 1992, Pat. No. 5,240,109, which is a continuation of Ser. No. 831,767, Feb. 5, 1992, Pat. No. 5,148,918, which is a continuation-in-part of Ser. No. 692,329, Apr. 26, 1991, Pat. No. 5,092,465.

[51] Int. Cl.⁶ .................................................... B65B 13/02
[52] U.S. Cl. ................................................ 53/399; 53/397
[58] Field of Search .............................. 248/27.8, 205.3; 40/549, 618; 53/397, 399, 461, 465

[56] References Cited

U.S. PATENT DOCUMENTS

| Re. 21,065 | 5/1939 | Copeman ..................................... 93/2 |
|---|---|---|
| 732,889 | 7/1903 | Paver . |
| 1,446,563 | 2/1923 | Hughes . |
| 1,525,015 | 2/1925 | Weeks . |
| 1,807,407 | 5/1931 | Hohnhorst . |
| 1,863,216 | 6/1932 | Wordingham . |
| 1,978,631 | 10/1934 | Herrlinger .................................. 91/68 |

(List continued on next page.)

FOREIGN PATENT DOCUMENTS

| 2221936 | 10/1974 | France . |
|---|---|---|
| 2610604 | 8/1988 | France . |
| 2675774 | 10/1992 | France . |
| 345464 | 2/1917 | Germany . |

OTHER PUBLICATIONS

"Speed Cover—The Simple Solution For Those Peak Volume Periods", Highland Supply Corporation, 1989, 5 pgs.

"Speed Sheets and Speed Rolls", Highland Supply Corporation, 1990, 2 pgs.

"A World of Cut Flower and Pot Plant Packaging", Klerks Plastic Products Manufacturing, date unknown, 6 pages. Applicant admits that the products described in this brochure have been on sale at least more than one year prior to the filing of the present patent application.

*Primary Examiner*—Linda Johnson
*Attorney, Agent, or Firm*—Dunlap, Codding & Rogers, P.C.

[57] ABSTRACT

A wrapping material for wrapping an item, such as a floral grouping is provided. The wrapping material has a bonding material on a surface so that, when the wrapping material is formed into a wrapper, the wrapper may be releasably attached to a mounting surface, such as a board or wall, by way of the bonding material.

26 Claims, 5 Drawing Sheets

U.S. PATENT DOCUMENTS

| | | | |
|---|---|---|---|
| 2,048,123 | 7/1936 | Howard | 229/87 |
| 2,170,147 | 8/1939 | Lane | 206/56 |
| 2,278,673 | 4/1942 | Savada et al. | 154/43 |
| 2,302,259 | 11/1942 | Rothfuss | 41/10 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,549,352 | 4/1951 | White | 248/27.8 |
| 2,621,142 | 12/1952 | Wetherell | 154/117 |
| 2,707,352 | 5/1955 | Fischer et al. | 47/58 |
| 2,744,624 | 5/1956 | Hoogstoel et al. | 206/65 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 3,022,605 | 2/1962 | Reynolds | 47/58 |
| 3,121,647 | 2/1964 | Harris et al. | 118/202 |
| 3,130,113 | 4/1964 | Silman | 161/97 |
| 3,167,181 | 1/1965 | Goodman | 206/56 |
| 3,261,126 | 7/1966 | Marks | 248/205.3 |
| 3,271,922 | 9/1966 | Wallerstein et al. | 53/3 |
| 3,508,372 | 4/1970 | Wallerstein et al. | 53/3 |
| 3,524,583 | 8/1970 | Gregory | 229/87 |
| 3,620,366 | 11/1971 | Parkinson | 206/59 |
| 3,681,105 | 8/1972 | Milutin et al. | 117/15 |
| 3,793,799 | 2/1974 | Howe et al. | 53/32 |
| 3,915,302 | 10/1975 | Farrelly et al. | 206/460 |
| 4,054,697 | 10/1977 | Reed et al. | 428/40 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,300,312 | 11/1981 | Weder | 47/72 |
| 4,333,267 | 6/1982 | Witte | 47/84 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,678,150 | 7/1987 | Newman et al. | 248/205.3 |
| 4,765,464 | 8/1988 | Ristvedt | 206/0.82 |
| 4,799,520 | 1/1989 | Blackburn et al. | 150/52 |
| 4,801,014 | 1/1989 | Meadows | 206/423 |
| 4,817,805 | 4/1989 | Rodriquez | 248/205.3 |
| 4,941,572 | 7/1990 | Harris | 206/423 |
| 4,996,822 | 3/1991 | Truppe | 53/213 |
| 5,092,465 | 3/1992 | Weder et al. | 206/423 |
| 5,111,638 | 5/1992 | Weder | 53/397 |
| 5,148,918 | 9/1992 | Weder et al. | 206/423 |
| 5,181,364 | 1/1993 | Weder | 53/397 |
| 5,195,637 | 3/1993 | Weder | 206/423 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,240,109 | 8/1993 | Weder et al. | 206/423 |
| 5,255,784 | 10/1993 | Weder et al. | 206/423 |
| 5,311,992 | 5/1994 | Weder et al. | 206/423 |
| 5,318,821 | 6/1994 | Bradley | 428/100 |
| 5,697,199 | 12/1997 | Weder | 53/399 |

MOUNTABLE AND DEMOUNTABLE WRAPPING MATERIAL AND METHOD FOR USE

RELATED REFERENCES

This application is a continuation of U.S. Ser. No. 08/474,059, filed Jun. 7, 1995, entitled MOUNTABLE AND DEMOUNTABLE WRAPPING MATERIAL AND METHOD FOR USE now U.S. Pat. No. 5,697,199; which is a continuation-in-part of U.S. Ser. No. 08/385,604, filed Feb. 9, 1995, entitled METHOD OF COVERING A POT, now U.S. Pat. No. 5,560,181; which is a continuation of U.S. Ser. No. 08/313,675, filed Sep. 27, 1994, entitled METHOD FOR WRAPPING AN OBJECT WITH AN EMBOSSED MATERIAL, now abandoned; which is a continuation of U.S. Ser. No. 08/188,183 filed Jan. 28, 1994, entitled METHOD FOR WRAPPING AN OBJECT WITH AN EMBOSSED MATERIAL HAVING AN ADHESIVE THEREON, now U.S. Pat. No. 5,388,386; which is a continuation of U.S. Ser. No. 07/968,798, filed Oct. 30, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,369,934; which is a continuation of U.S. Ser. No. 07/865,563, filed Apr. 9, 1992, entitled METHODS FOR WRAPPING A FLORAL GROUPING, now U.S. Pat. No. 5,245,814; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638; which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. Ser. No. 07/219,083, filed Jul. 13, 1988, entitled ARTICLE FORMING SYSTEM, now U.S. Pat. No. 4,897,031; which is a continuation of U.S. Ser. No. 07/004,275, filed Jan. 5, 1987, entitled ARTICLE FORMING SYSTEM, now U.S. Pat. No. 4,773,182; which is a continuation of U.S. Ser. No. 06/613,080, filed May 22, 1984, entitled ARTICLE FORMING SYSTEM, now abandoned.

Said application Ser. No. 08/474,059 is also a continuation-in-part of U.S. Ser. No. 08/370,334, filed Jan. 9, 1995, entitled WRAPPING A FLORAL GROUPING WITH SHEETS HAVING ADHESIVE OR COHESIVE MATERIAL APPLIED THERETO, now U.S. Pat. No. 5,537,800; which is a continuation of U.S. Ser. No. 08/253,648, filed Jun. 3, 1994, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/965,585, filed Oct. 23, 1992, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364; which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed March 29, 1990, entitled WRAPPING A FLORAL GROUPING WITH SHEETS HAVING ADHESIVE OR COHESIVE MATERIAL APPLIED THERETO, now abandoned; which is a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

Said application Ser. No. 08/474,059 is also a continuation-in-part of U.S. Ser. No. 08/382,096, filed Jan. 24, 1995, entitled RETAINING FLAP FOR SHIPPING CARTONS; which is a continuation of U.S. Ser. No. 08/202,058, filed Feb. 25, 1994, entitled RETAINING FLAP FOR SHIPPING CARTONS, now U.S. Pat. No. 5,411,137; which is a continuation of U.S. Ser. No. 08/093,109, filed Jul. 16, 1993, entitled RETAINING FLAP FOR SHIPPING CARTONS, now U.S. Pat. No. 5,311,992; which is a continuation-in-part of U.S. Ser. No. 07/892,441, filed Jun. 2, 1992, entitled SHIPPING CARTON FOR FLORAL GROUPING ASSEMBLIES, now U.S. Pat. No. 5,240,109; which is a continuation of U.S. Ser. No. 07/831,767, filed Feb. 5, 1992, entitled SHIPPING CARTON FOR FLORAL GROUPING ASSEMBLIES, now U.S. Pat. No. 5,148,918; which is a continuation-in-part of U.S. Ser. No. 07/692,329, filed Apr. 26, 1991, entitled SHIPPING CARTON FOR FLORAL GROUPING ASSEMBLIES, now U.S. Pat. No. 5,092,465.

FIELD OF THE INVENTION

The present invention relates generally to wrapping material, and more specifically, but not by way of limitation, to a wrapping material that can be mounted and removed from a surface, such as, for example, a wall, display board or window.

DESCRIPTION OF THE PREFERRED EMBODIMENTS

Figure 1:
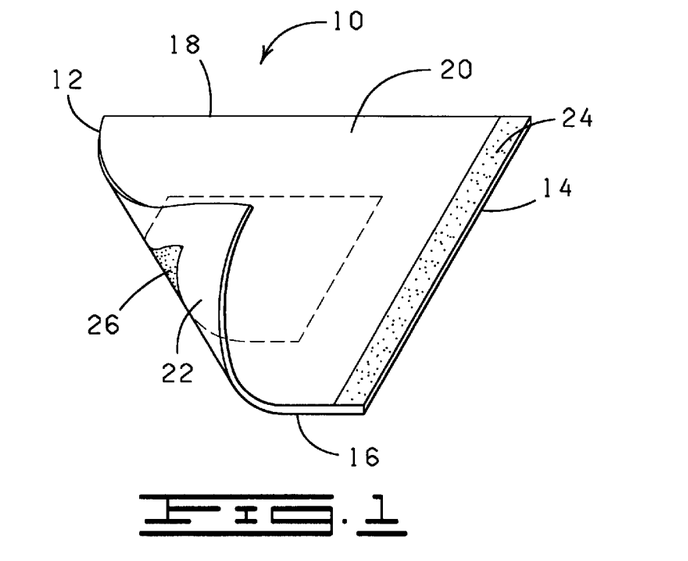
FIG. 1 is a perspective view of a sheet of material constructed in accordance with the present invention.

Shown in FIG. 1 is a sheet of material 10 constructed in accordance with the present invention. The sheet of material 10 has a first side 12, a second side 14, a first end 16, a second end 18, an upper surface 20 and a lower surface 22. A strip of bonding material 24 is applied to the upper surface 20 near to or adjacent the second side 14. The bonding material 24 extends between the first and second ends 16 and 18 of the sheet of material 10.

The term "bonding material" as used herein means an adhesive, preferably a pressure sensitive adhesive, or a cohesive. Where the bonding material is a cohesive, a similar cohesive material must be placed on an adjacent surface for bondingly contacting and bondingly engaging the cohesive material. In the embodiment of the invention shown in FIG. 1, the strip of bonding material 24 extending between the first end 16 and the second end 18 is an adhesive.

The sheet of material 10 additionally has a patch of bonding material 26 disposed on a portion of the lower surface 22 of the sheet of material 10. In the embodiment shown in FIG. 1 the bonding material of the patch is an adhesive.

The sheet of material 10 is constructed from any suitable material that is capable of being wrapped about an item as described herein. Preferably, the sheet of material 10 comprises paper (untreated or treated in any manner), cellophane, foil, man-made organic polymer film or combinations thereof. The sheet of material 10 can also be cloth (natural or synthetic) or burlap (natural or synthetic), or combinations thereof.

The sheet of material 10 may be constructed of a single layer of material or a plurality of layers of the same or different types of materials. Any thickness of the sheet of material 10 may be utilized in accordance with the present invention as long as the sheet of material 10 is wrappable about an item. Additionally, an insulating material, such as bubble film, preferable as one of two layers, can be utilized in order to provide needed protection for the item wrapped in the sheet of material 10. In preferred embodiments, the sheet of material 10 is constructed from two polypropylene films (a 20-inch times 50-inch sheet of Mobil 270 ABW white opaque film laminated to a 20-inch by 15-inch sheet of Mobil 220 AB clear film), or from one or more sheets of paper having a thickness in a range from about 1.0 mil. to about 2.5 mils. although the thickness of the sheets of material 10 could be as great as 30 mils.

The term "man-made organic polymer film" means a man-made resin, such as polypropylene, as opposed to naturally occurring resins such as cellophane.

A man-made organic polymer film is relatively strong and not as subject to tearing (substantially non-tearable) as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof, which may be desirable in many applications such as wrapping a floral grouping. Additionally, a relatively thin film of substantially linearly linked processed organic polymer does not substantially deteriorate in sunlight. Processed organic polymer films having carbon atoms both linearly linked and cross-linked, and some cross-linked polymer films, also may be suitable for use in the present invention provided that such films are substantially flexible and can be made in a sheet-like format for wrapping purposes consistent with the present invention. For example, one man-made organic polymer film is a polypropylene film.

A decorative pattern, such as a color and/or an embossed pattern, and/or such other decorative surface ornamentation may be applied to the upper surface and/or the lower surface of the sheet of material 10 or portions thereof including, but not limited to, printed designs, coatings, colors, flocking or metallic finishes. The sheet of material 10 also may be totally or partially clear or tinted transparent material.

The sheet of material 10 may be of any shape and a square shape is shown in FIG. 1 only by way of example. The sheet of material 10 is shown in FIG. 1 with the strip 24 of bonding material disposed adjacent the second side 14 of the sheet. In other embodiments, bonding material in multiple strips or in different positions on sheets of material, other than that discussed in detail below, are used.

A plurality of sheets of material 10 are connected together to form a pad 32 of sheets of material, as shown in FIGS. 2–5. The pad 32 contains a plurality of sheets of material 10 with a top sheet of material 10 disposed on the top of the pad 32 and the remaining sheets of material 10 of the pad 32 disposed generally under the top sheet of material 10. Each of the sheets of material 10, including the top sheet of material 10, has a first side 12, a second side 14, a first end 16, a second end 18, an upper surface 20 and a lower surface 22. As discussed previously, a bonding material 24 comprising an adhesive is applied to the upper surface 20 of each of the sheets of material 10, including the top sheet of material 10, generally near and extending a distance from the second side 14 thereof. With the adhesive extending generally between the first and second ends 16, 18 of each of the sheets of material 10, the bonding material is applied to the upper surface 20 of each of the sheets of material 10 substantially as shown. Additionally, a bonding material 26 consisting of either a cohesive or an adhesive is applied to the lower surface 22 of each of the sheets of material 10 substantially as shown for the sheet of material 10 in FIG. 1. When the bonding material 26 on the lower surface 22 consists of a cohesive, it cooperates with the bonding material 24 on the upper surface 20 of the adjacent lower sheet of material 10 to assist in holding the sheets of material 10 into the pad 32.

Figure 2:
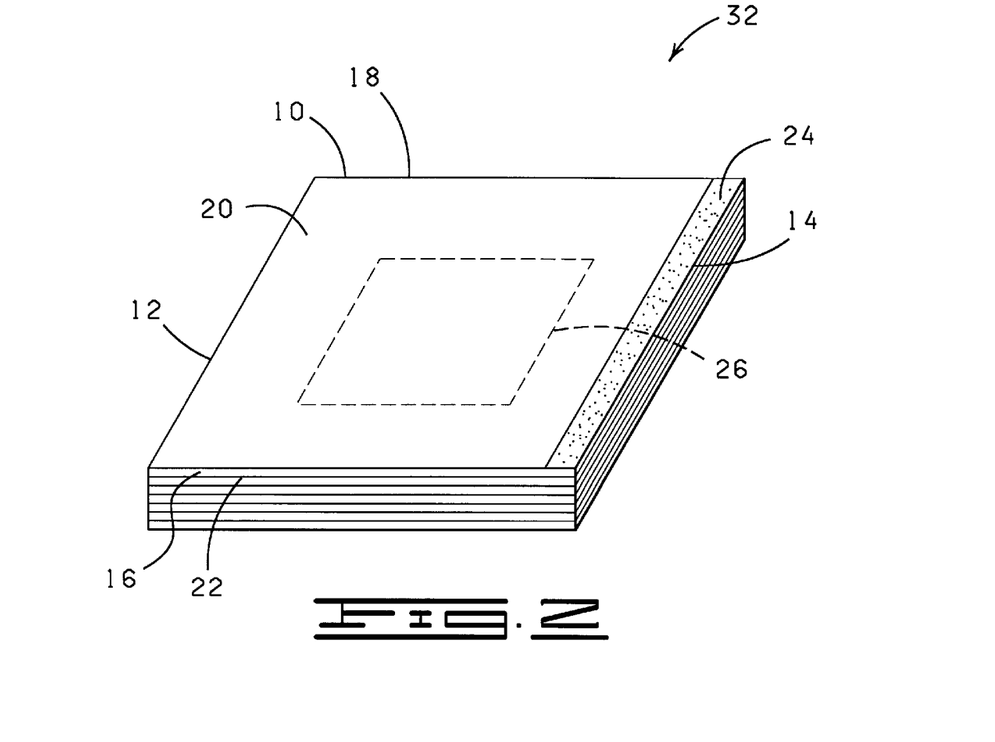
FIG. 2 is a perspective view of a plurality of sheets of material, each sheet of material constructed in the same manner as the sheet shown in FIG. 1, with the sheets of material connected to form a pad.

Additionally, the sheets of material 10 can be connected together to form the pad 32 by binding the sheets of material 10 along their second sides 14 with a binding material (not shown). Any conventional binding material capable of binding the second sides 14 of the sheets of material 10 can be employed as the binding material. Such binding materials, as well as the technique for binding sheets of material along one side to form a pad, are well known in the art.

Each of the sheets of material 10 in the pad 32 is releasably connected to the other sheets of material 10 by way of the bonding material 24 and/or the bonding material 26 in a releasable manner. The sheet of material 10 can be removed from the pad 32 by lifting the sheet of material 10 from the pad 32 and disconnecting the bond formed by the bonding material 24 and/or 26.

Figure 3:
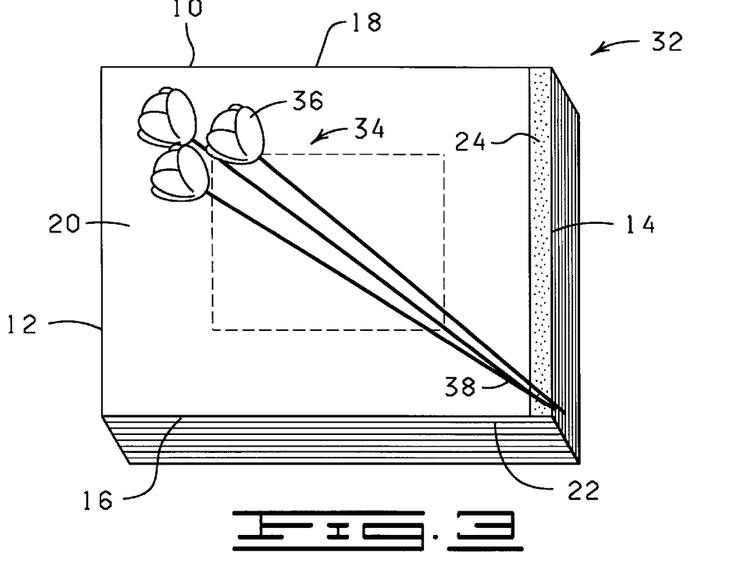
FIG. 3 is a perspective view of the pad of sheets of material shown in FIG. 2, with a floral grouping disposed on the top sheet of material in the pad.

As shown in FIG. 3, an item, such as a floral grouping 34, is placed on the upper surface 20 of the top sheet of material 10. The term "floral grouping" as used herein means cut fresh flowers, artificial flowers, or other fresh and/or artificial plants or other floral materials and may include other secondary plants and/or ornamentation which add to the aesthetics of the overall floral grouping 34. The floral grouping 34 has a bloom end 36 and a stem end 38.

The floral grouping 34 is disposed on the top sheet of material 10 of the pad 32 so that a portion of the stem end 38 of the floral grouping 34 overlays a portion of the bonding material 24 substantially as shown.

Figure 4:
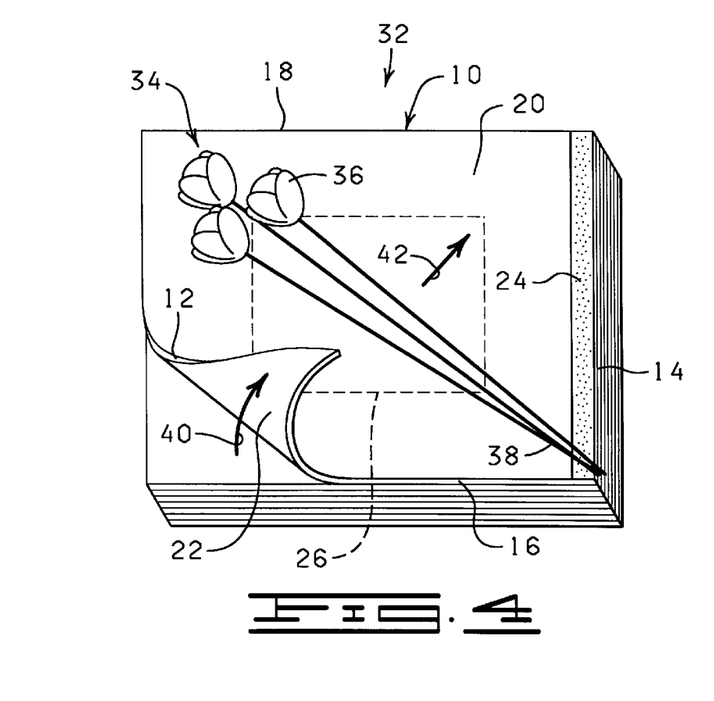
FIG. 4 is a perspective view of the floral grouping and pad shown in FIG. 3, with a portion of the top sheet of material positioned to be wrapped about the floral grouping.
Figure 5:
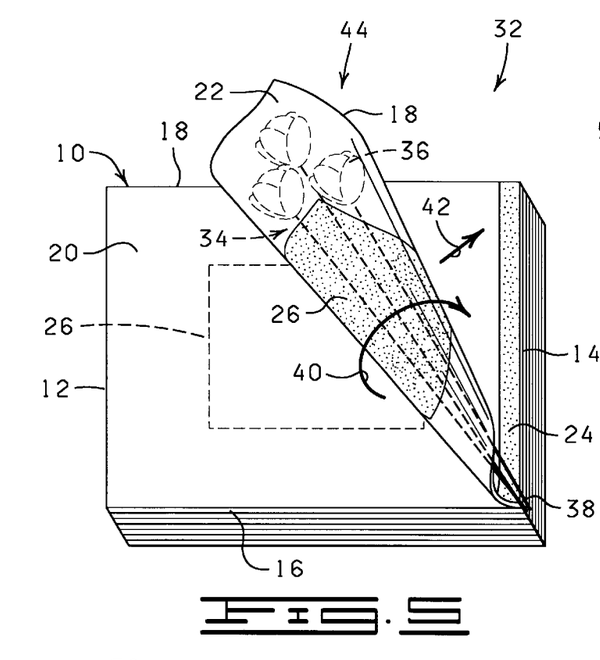
FIG. 5 is a perspective view of the pad shown in FIG. 4 with a portion of the top sheet of material wrapped about the floral grouping.
Figure 6:
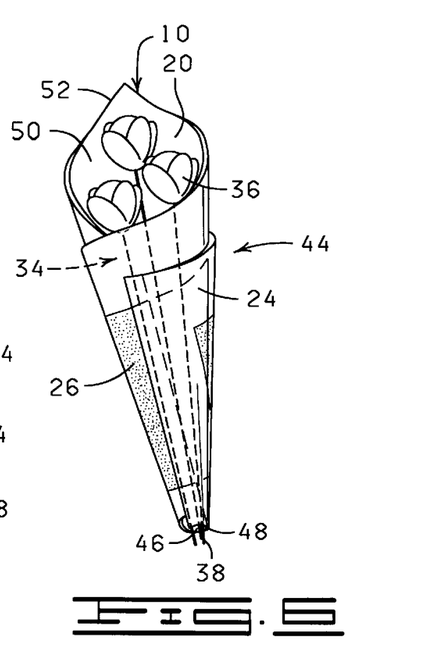
FIG. 6 is a perspective view of the sheet of material shown in FIG. 1 formed into a wrapper containing the floral grouping.

Referring now to FIGS. 4, 5 and 6, the floral grouping 34 is wrapped within the top sheet of material 10, by lifting a corner of the top sheet of material 10 (formed from adjacent portions of the first side 12 and the first end 16) and placing the corner generally about the floral grouping 34. In this position, the top sheet of material 10 and the floral grouping 34 are rolled in a rolling direction 40 and in a direction 42 (FIG. 4) generally toward the bonding material 24 disposed along the second side 14 of the top sheet of material 10, thereby rolling the top sheet of material 10 about the floral grouping 34 to provide a wrapper 44 (FIG. 6) for the floral grouping 34 having an opening 46 extending through a lower end 48 thereof and an opening 50 extending through an upper end 52 thereof. The patch of bonding material 26 on the lower surface 22 of the sheet of material 10 is thereby exposed and is available to be releasably connected to a surface, as will be explained in detail below.

The stem end 38 of the floral grouping 34 extends through the opening 46 in the lower end 48 of the wrapper 44 and the bloom end 36 of the floral grouping 34 is exposed near the opening 50 in the upper end 52 of the wrapper 44. The upper end 52 of the wrapper 44 is adjusted as desired to compensate for the size of the bloom end 36 of the floral grouping 34. Once the wrapping of the top sheet of material 10 about the floral grouping 34 is completed, the adhesive material 24 is utilized to adhesively connect the second side 14 of the top sheet of material 10 to an adjacent portion of the top sheet of material 10, thereby ensuring that the resulting wrapper 44 is securely wrapped generally about the floral grouping 34 and there are substantially no flaps formed by unbonded portions of the top sheet of material 10, as shown in FIG. 6.

When the top sheet of material 10 has been secured about the floral grouping 34 in the manner just described, the sheet of material 10 generally under the top sheet of material 10 then provides a new top sheet of material 10 and the process can be repeated for wrapping additional or other floral groupings 34 until substantially all the sheets of material 10 in the pad 32 have been wrapped about the floral groupings 34.

Figure 7:
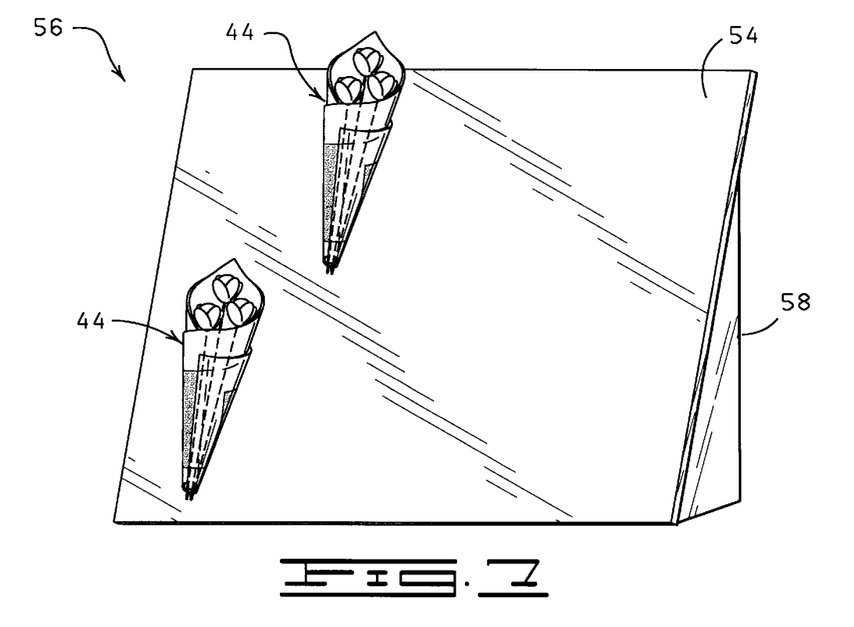
FIG. 7 is a perspective view of two of the wrappers shown in FIG. 6, removably attached to a display assembly.
Figure 8:
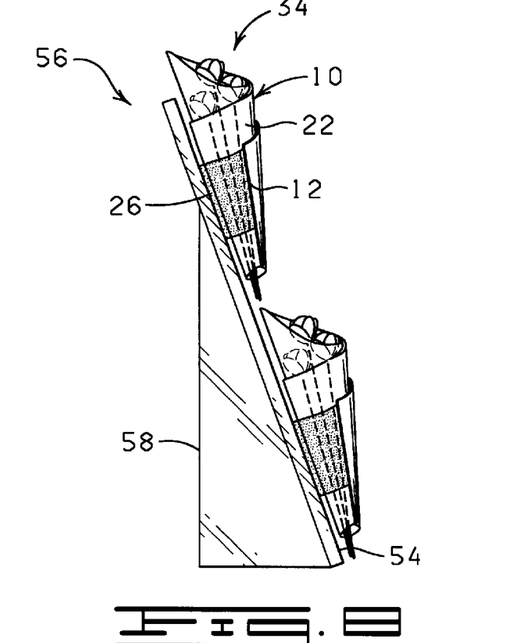
FIG. 8 is a side view of the wrappers and the display assembly shown in FIG. 7.

FIG. 7 shows two wrappers 44 containing floral groupings 34 disposed on a mounting surface 54 of a display assembly 56. The display assembly 56 includes the mounting surface 54 and a support member 58. As shown in FIGS. 7 and 8, the wrapper 44 is secured by the bonding material 26 applied to the lower surface 22 of the sheet of material 10, the bonding material 26 being releasably connected to the mounting surface 54 of the display assembly 56. Although the wrapper 44 is shown releasably connected to the mounting surface 54 of a display assembly 56 in FIGS. 6 and 7, it is understood that the wrapper 44 can similarly be connected to other surfaces, such as, for example, and not by way of limitation, a pane of glass, such as in a window, the top surface of a table, or a wall.

As previously discussed, the bonding material 26 comprises an adhesive, and more particularly a pressure sensitive adhesive, wherein when pressure is applied to the wrapper 44, the pressure releasably affixes the wrapper 44 to the mounting surface 54. When a pulling or lifting force is applied to the wrapper 44, the force is sufficient to release the wrapper 44 from the mounting surface 54.

Figure 9:
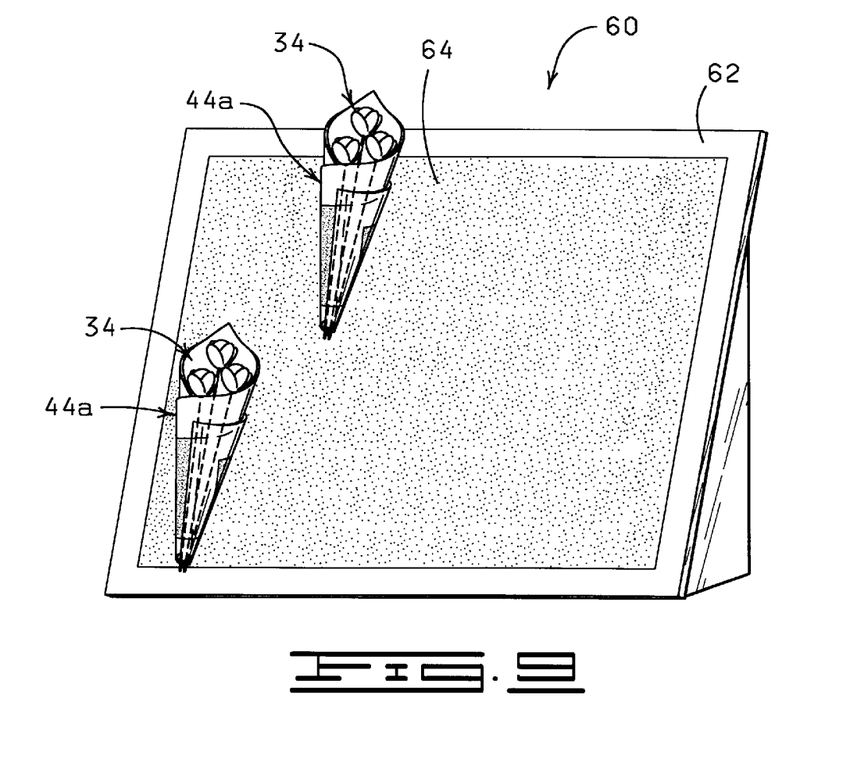
FIG. 9 is another embodiment of two wrappers constructed in accordance with the present invention and removably attached to a display assembly.
Figure 10:
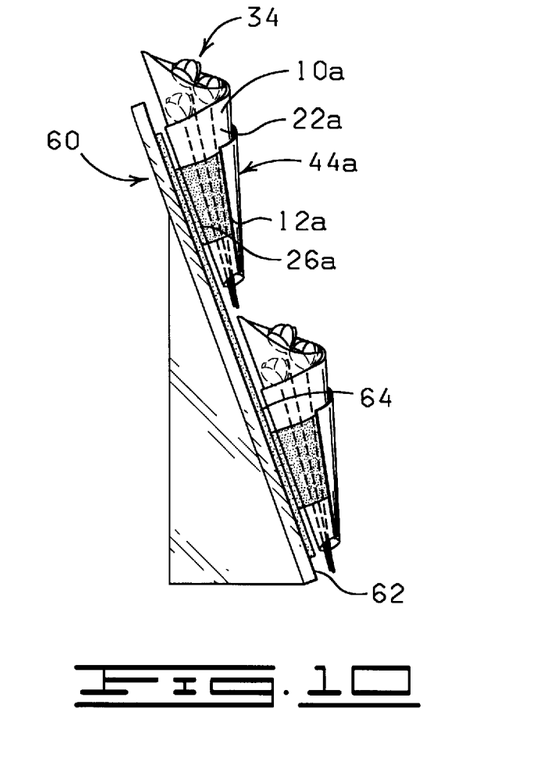
FIG. 10 is a side view of the wrappers and the display assembly shown in FIG. 9.

Referring now to FIGS. 9 and 10, a display assembly 60 is shown which is exactly the same as the display assembly 56 shown in FIG. 7, except that the display assembly 60 has a mounting surface 62 upon which a bonding material 64 consisting of a cohesive is disposed. Two wrappers 44a are affixed to the bonding material 64 of the mounting surface 62 of the display assembly 60, each of the wrappers 44a containing a floral grouping 34.

A portion of the bonding material 64 on the mounting surface 62 of the display assembly 60 bondingly and releasably connects to a portion of the bonding material 26a disposed on the wrapper 44a.

When the bonding material 64 on the mounting surface 62 is a cohesive, it is understood that the bonding material 26a on the wrapper 44a will also comprise a cohesive adapted to cohere to the cohesive of the bonding material 64. By using bonding materials 64 and 26a which are cohesives that can cohere one to another, a releasable connection between the bonding materials 64 and 26a can be made; thus the wrapper 44a can be removably secured to the mounting surface 62 of the display assembly 60, while at the same time allowing the wrapper 44a to be easily removed from the mounting surface 62 of the display assembly 60.

An advantage of using bonding materials 64 and 26a which are compatible cohesives is that the bonding materials 64 and 26a will tend to resist the attraction of extraneous materials such as dirt or lint, because substances other than a compatible cohesive will not cohere to the bonding materials 64 and 26a.

Figure 11:
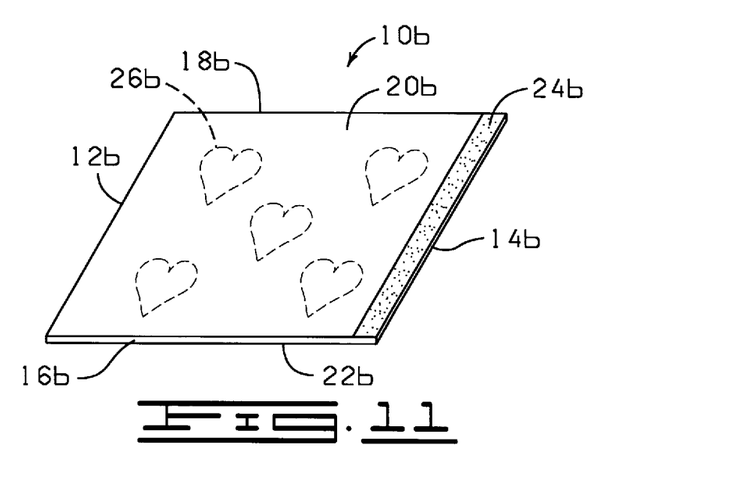
FIG. 11 is a perspective view of another sheet of material constructed in accordance with the present invention.

Shown in FIG. 11 is a sheet of material 10b constructed in accordance with the present invention. The sheet of material 10b has a first side 12b, a second side 14b, a first end 16b, a second end 18b, an upper surface 20b, and a lower surface 22b. A strip of bonding material 24b extends between the first and second ends 16b, 18b of the sheet of material 10b. Additionally, a bonding material 26b is applied to the lower surface 22b of the sheet of material 10b. Bonding material disposed on the lower surface 22b is shown in phantom and is illustrated in the form of five hearts, only one heart being designated by the reference numeral 26b; however, the bonding material can be disposed on the lower surface 22b of the sheet of material 10b in any desired shape, figure, or combination of shapes and figures. For example, and not by way of limitation, the bonding material can be in the form of geometric shapes, stars, diamonds, animal figures, figures of flowers, or other fanciful or decorative designs. Generally, except as discussed above, the sheet of material 10b will be constructed and used in the same manner as the sheet of material 10 shown in FIG. 1.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for displaying a wrapped floral grouping, comprising the steps of:

providing a support surface, the support surface formed such that said surface holds and supports a wrapper having a floral grouping disposed therein, said surface having a connecting means disposed thereon;

providing a floral grouping disposed in a wrapper;

disposing the wrapper adjacent at least a portion of the connecting means on the support surface;

positioning the wrapper on the support surface such that the wrapper and the floral grouping therein are optimally displayed on the support surface; and connecting the wrapper to the support surface by pressing the wrapper against the connecting means on the support surface.

2. The method of claim 1 wherein in the step of providing a floral grouping disposed in a wrapper, the wrapper is further defined as having an outer peripheral surface having a connecting means disposed thereon.

3. The method of claim 2 wherein the connecting means on the outer peripheral surface of the wrapper comprises an adhesive.

4. The method of claim 2 wherein the connecting means on the outer peripheral surface of the wrapper comprises a cohesive.

5. The method of claim 1 wherein in the step of providing a support surface, the connecting means comprises an adhesive.

6. The method of claim 1 wherein in the step of providing a support surface, the connecting means comprises a cohesive.

7. The method of claim 1 wherein in the step of providing a floral grouping disposed in a wrapper, the wrapper is formed from a sheet of material selected from the group consisting of paper, cellophane, foil, polymer film, cloth, burlap and combinations thereof.

8. The method of claim 1 wherein in the step of providing a floral grouping disposed in a wrapper, the wrapper is further defined as being formed from a sheet of material having a thickness in a range from about 1 mil to about 30 mils.

9. The method of claim 1 wherein in the step of providing a floral grouping disposed in a wrapper, the wrapper is further defined as being formed from a sheet of material comprising a polymer film.

10. A method for displaying a wrapped floral grouping, comprising:

providing a support surface, the support surface formed such that said surface holds and supports a wrapper having a floral grouping disposed therein;

providing a floral grouping disposed in a wrapper, the wrapper having an outer peripheral surface with a connecting means disposed thereon;

disposing the wrapper adjacent the support surface, at least a portion of the connecting means on the wrapper disposed adjacent the support surface;

positioning the wrapper such that the wrapper and the floral grouping therein are optimally displayed on the support surface; and connecting the wrapper to the support surface by pressing the connecting means of the wrapper against the support surface.

11. The method of claim 10 wherein in the step of providing a support surface, the support surface further comprises a support surface connecting means.

12. The method of claim 11 wherein the support surface connecting means comprises an adhesive.

13. The method of claim 11 wherein the support surface connecting means comprises a cohesive.

14. The method of claim 10 wherein in the step of providing a floral grouping disposed in a wrapper, the connecting means on the wrapper further comprises an adhesive.

15. The method of claim 10 wherein in the step of providing a floral grouping disposed in a wrapper, the connecting means on the wrapper further comprises a cohesive.

16. The method of claim 10 wherein in the step of providing a floral grouping disposed in a wrapper, the wrapper is further defined as being formed from a sheet of material selected from the group consisting of paper, cellophane, foil, polymer film, cloth, burlap and combinations thereof.

17. The method of claim 10 wherein in the step of providing a floral grouping disposed in a wrapper, the wrapper is further defined as being formed from a sheet of material having a thickness in a range from about 1 mil to about 30 mils.

18. The method of claim 10 wherein in the step of providing a floral grouping disposed in a wrapper, the wrapper is further defined as being formed from a sheet of material comprising a polymer film.

19. A method for displaying a wrapped floral grouping, comprising:

providing a support surface, the support surface formed such that said support surface holds and supports a wrapper having a floral grouping disposed therein, said support surface having a support surface connecting means disposed thereon;

providing a floral grouping disposed in a wrapper, the wrapper having an outer peripheral surface with a connecting means disposed thereon;

disposing the wrapper adjacent the support surface, at least a portion of the connecting means on the wrapper disposed adjacent at least a portion of the support surface connecting means on the support surface;

positioning the wrapper such that the wrapper and the floral grouping therein are optimally displayed on the support surface; and connecting the wrapper to the support surface by pressing the connecting means on the wrapper against the support surface connecting means of the support surface.

20. The method of claim 19 wherein in the step of providing a floral grouping disposed in a wrapper, the connecting means on the wrapper comprises an adhesive.

21. The method of claim 19 wherein in the step of providing a floral grouping disposed in a wrapper, the connecting means on the wrapper comprises a cohesive.

22. The method of claim 19 wherein in the step of providing a support surface, the support surface connecting means comprises an adhesive.

23. The method of claim 19 wherein in the step of providing a support surface, the support surface connecting means comprises a cohesive.

24. The method of claim 19 wherein in the step of providing a floral grouping disposed in a wrapper, the wrapper is further defined as being formed from a sheet of material selected from the group consisting of paper, cellophane, foil, polymer film, cloth, burlap and combinations thereof.

25. The method of claim 19 wherein in the step of providing a floral grouping disposed in a wrapper, the wrapper is further defined as being formed from a sheet of material having a thickness in a range from about 1 mil to about 30 mils.

26. The method of claim 19 wherein in the step of providing a floral grouping disposed in a wrapper, the wrapper is further defined as being formed from a sheet of material comprising a polymer film.

* * * * *

UNITED STATES PATENT AND TRADEMARK OFFICE
CERTIFICATE OF CORRECTION

PATENT NO. : 5,867,968
DATED : February 9, 1999
INVENTOR(S) : Donald E. WEDER

Page 1 of 3

It is certified that error appears in the above-indentified patent and that said Letters Patent is hereby corrected as shown below:

Title page

In the "[*] Notice:" regarding the terminal disclaimer, please delete "5,697,195." and substitute therefor --5,697,199.--.

Col. 3: line 24, after "material" and before "of" insert --26--;

Col. 4: line 8, after "surface" and before "and/or" insert --20--; and after "lower surface" insert --22--;

line 34, after "material" and before "is" insert --24--;

Col. 6: line 30, delete "lob" and substitute therefor --10$b$-- ;

line 37, after "material" insert --26$b$--; and line 41, after "material" and before "can" insert --26$b$--.

Signed and Sealed this

Twenty-fourth Day of April, 2001

NICHOLAS P. GODICI

*Attest:*

*Attesting Officer*   Acting Director of the United States Patent and Trademark Office

UNITED STATES PATENT AND TRADEMARK OFFICE
CERTIFICATE OF CORRECTION

Page 2 of 3

PATENT NO.   :   5,867,968
DATED        :   February 9, 1999
INVENTOR(S)  :   Donald E. WEDER It is certified that error appears in the above-identified patent and that said Letters Patent is hereby corrected as shown below:

In the Drawings:

Fig. 7, insert the numeral --34-- and its respective lead line, as shown.

UNITED STATES PATENT AND TRADEMARK OFFICE
CERTIFICATE OF CORRECTION

PATENT NO.   :   5,867,968                              Page 3 of 3
DATED        :   February 9, 1999
INVENTOR(S)  :   Donald E. WEDER It is certified that error appears in the above-identified patent and that said Letters Patent is hereby corrected as shown below:

Fig. 8, insert the numeral --44-- and its respective lead line, as shown.